(12) United States Patent
Li et al.

(10) Patent No.: US 10,382,388 B2
(45) Date of Patent: Aug. 13, 2019

(54) DETERMINING CONSENSUS IN A DECENTRALIZED DOMAIN NAME SYSTEM

(71) Applicants: PEKING UNIVERSITY SHENZHEN GRADUATE SCHOOL, Guangdong (CN); NATIONAL DIGITAL SWITCHING SYSTEM ENGINEERING TECHNOLOGY RESEARCH CENTER, Zhengzhou (CN); CHINA TELECOM CO., LTD. SHENZHEN BRANCH, Shenzhen (CN); CHINA UNITED NETWORK COMMUNICATIONS CO., LTD., Beijing (CN); FOSHAN SAISICHAN TECHNOLOGY CO., LTD., Foshan (CN)

(72) Inventors: Hui Li, Shenzhen (CN); Jiangxing Wu, Zhengzhou (CN); Kejiao Li, Foshan (CN); Peng Yi, Zhengzhou (CN); Fusheng Zhu, Gangzhou (CN); Ke Xu, Beijing (CN); Xinchun Zhang, Shenzhen (CN); Mengchang Chen, Guangzhou (CN); Han Wang, Shenzhen (CN); Shisheng Chen, Shenzhen (CN); Yiqin Lu, Shenzhen (CN); Yunyong Zhang, Beijing (CN); Jinwu Wei, Beijing (CN); Shengfei Li, Shenzhen (CN); Kedan Li, Shenzhen (CN); Huiyao An, Shenzhen (CN); Junfeng Ma, Shenzhen (CN); Wei Li, Guangzhou (CN); Minqian Pu, Shenzhen (CN); Kaixuan Xing, Shenzhen (CN)

( * ) Notice: Subject to any disclaimer, the term of this patent is extended or adjusted under 35 U.S.C. 154(b) by 0 days.

(21) Appl. No.: 15/997,710

(22) Filed: Jun. 5, 2018

(65) Prior Publication Data
US 2018/0337882 A1 Nov. 22, 2018

Related U.S. Application Data

(63) Continuation of application No. PCT/CN2017/084431, filed on May 16, 2017.

(51) Int. Cl.
*H04L 29/12* (2006.01)
*G06F 7/58* (2006.01)
(Continued)

(52) U.S. Cl.
CPC .......... *H04L 61/1511* (2013.01); *G06F 7/588* (2013.01); *G06Q 20/0658* (2013.01);
(Continued)

(58) Field of Classification Search
CPC ............................ G06Q 40/12; H04L 61/1511
See application file for complete search history.

(56) References Cited

U.S. PATENT DOCUMENTS 9,875,510 B1 * 1/2018 Kasper ................. G06Q 40/12
2016/0191243 A1   6/2016 Manning

FOREIGN PATENT DOCUMENTS

| CN | 106529951 A | 6/2016 |
|----|-------------|--------|
| CN | 106027264 A | 10/2016 |

(Continued)

OTHER PUBLICATIONS

Daniel Cawrey, "Are 51% Attacks a Real Threat to Bitcoin?," Jun. 20, 2014. (Year: 2014).*

(Continued)

*Primary Examiner* — Andrew C Georgandellis
(74) *Attorney, Agent, or Firm* — Zheng "Andy" Liu (57) ABSTRACT

A method comprising: A. forming a consortium blockchain network using domain network nodes and selecting com- (Continued)

mittee members from top-level domain nodes; B. the committee member who received most votes packs the genesis block and generates a random number; C. the housekeeper having the same number as the random number packs the current block and generates a random number for selecting a next housekeeper to pack the next block, each block is approved by more than half of the committee members; D. during the duty cycle, each housekeeper takes turns packing blocks and generating random numbers and the process is repeated. If a block is not approved, the housekeeper with the next number is requested to repack the block; and E. the last random number generated by a housekeeper before the duty cycle ends is used to select the housekeeper to pack the first block of the next duty cycle.

9 Claims, 6 Drawing Sheets

(51) Int. Cl.
*G06Q 20/06* (2012.01)
*H04L 9/06* (2006.01)
*H04L 29/08* (2006.01)

(52) U.S. Cl.
CPC ............ *H04L 9/0643* (2013.01); *H04L 61/35* (2013.01); *H04L 67/104* (2013.01)

(56) References Cited

FOREIGN PATENT DOCUMENTS

| | | |
|---|---|---|
| CN | 106060036 A | 10/2016 |
| CN | 106209947 A | 12/2016 |
| CN | 106529951 A | 3/2017 |
| WO | WO2016177026 | 11/2016 |

OTHER PUBLICATIONS

Colin Thompson, "The Difference Between a Private, Public & Consortium Blockchain," Mar. 16, 2017. (Year: 2017).*

Decker et al., "Bitcoin Meets Strong Consistency," Dec. 26, 2014. (Year: 2014).*

* cited by examiner

DETERMINING CONSENSUS IN A DECENTRALIZED DOMAIN NAME SYSTEM

CROSS REFERENCE TO RELATED APPLICATION

This application is a continuation of PCT patent application no. PCT/CN2017/084431, filed May 16, 2017, entitled "Determining consensus in a decentralized domain name system," which is hereby incorporated by reference in its entirety.

TECHNICAL FIELD

The present disclosure relates generally to communication network and more particularly to determining consensus in a decentralized domain name system.

BACKGROUND

After years of development through the Internet, the domain name system has become an important part of the Internet. The domain name system also has real world implications on issues such as censorship, domain name confiscation, and user privacy.

The domain name system for the Internet is sometimes referred to as the Internet Domain Name System (INDS). INDS serves as a distributed database that maps domain names and IP addresses and vice versa, making it easier for users to access the Internet. The primary role of a domain name system is resolving domain names, for example, mapping a human-friendly (e.g., human-readable) name of a computer or a group of computers on the Internet into a corresponding machine-readable IP address. A domain name system may be a distributed hierarchical system that includes a root domain; the next level under the root domain is called the top-level domain. For example, the top-level domain for the country of the People's Republic of China is ".cn."

Various technical challenges exit, however. For example, the current domain name system is a fully centralized system. The domain name root servers are managed by the Internet Corporation for Assigned Names and Numbers (ICANN) authorized by the United States. In order to improve the efficiency of domain name resolution, ICANN has deployed many root servers and mirror servers globally; the world's only primary root server is located in the United States.

The centralized control of the domain name system has also resulted in various technical difficulties and communication outages. The failure of the top-level domain name server in Iraq and the failure of the top-level domain name server in Libya are typical examples of such outages. Due to the lack of control over the root domain name server and the vulnerability of the domain name system itself, security risks are also present.

A decentralized domain name system may reduce or eliminate these technical problems.

SUMMARY

The present disclosure provides systems and methods for determining consensus in a decentralized domain name system to address the technical problems described in the present disclosure.

In some implementations, a method for determining consensus in a decentralized domain name systems, comprising:

A. using blockchain technology to form a consortium blockchain network of a plurality of domain network nodes and select a plurality of committee members from domain network nodes included in top-level domain to generate;

B. in the consortium blockchain network, requesting a committee member who receives most votes from other consortium members to pack a genesis block of the consortium blockchain and to generate a first random number. The first random number is used to select a housekeeper to pack a next block;

C. requesting, among all on-duty housekeepers in a duty cycle, a housekeeper that is assigned a same number as the first random number to pack a current block and to generate a second random number. The second random number is used to select a second housekeeper to pack a second next block; each block must be verified and signed by more than half of the committee members before it can be added to the consortium blockchain network;

D. requesting, during the duty cycle, each housekeeper in a plurality of housekeepers to take turns packing blocks and generating random numbers, which may include: when a block is not approved by more than half of the committee members or when the block is not successfully packed within a predefined time period, requesting a subsequent house keeper in the plurality of housekeepers repack the block;

E. selecting, based on the last random number generated by a housekeeper before the duty cycle ends, a third next housekeep to pack a first block of a next duty cycle, and repeating Step C to Step E. Information identifying all housekeepers assigned to each duty cycle is packed into the first block of each cycle.

In some implementations, the method further comprises: requesting a new node applying to become a committee member in the consortium blockchain to go through the committee's new member approval process; determining that more than 51% of the committee members approve the node's application; responsive to the determining, admitting the new applicant as a new committee member of the top-level domain committee.

In some implementations, the method further comprises: admitting a node in the consortium blockchain to become a housekeeper, including:

determining that the node is recommended by a committee member and is applying to become a housekeeper candidate;

selecting a predefined number of housekeepers from all housekeeper candidates in accordance with votes on each housekeeper candidate by committee members.

In some implementations, all committee members may have a first dual status as a committee member and a housekeeper or a second dual status as a committee member and a housekeeper candidate.

In some implementations, regular nodes, in the consortium blockchain network, are capable of joining or exiting the consortium blockchain network at any time, discarding messages, forging messages, and ceasing working. Additionally, regular nodes are not allow to participate in block generation, but only block distribution and sharing, as well as consuming services provided by the consortium blockchain network.

In some implementations, the method further comprises: admitting a node in the consortium blockchain to become a housekeeper candidate. The admission process includes: (1) determining that the node has registered a user account in the decentralized domain name system and submitted a housekeeper candidate application; (2) determining that the node has submitted a letter of recommendation signed by at least one member of the domain name committee; and (3) determining that the node has been approved by more than half of the committee members and has submitted a deposit, admitting the node to become a housekeeper candidate, In some implementations, the method further comprises F. requesting the top-level domain name committee members to vote and score all housekeeper candidates after each duty cycle.

In some implementations, a vote is either a default vote of confidence or a designated vote of confidence.

In some implementations, the method further comprises G. requesting committee members to determine whether or not each housekeeper is working and completing tasks timely when they are on duty.

When so, causing the committee to return the deposit when a housekeeper voluntary withdraws. When not so, deeming the housekeeper as having not signed a block as agreed or misbehaved, and causing the committee to do one or more of: dismissing the housekeeper, withhold the deposit submitted by the house keep, blacklisting the housekeeper, and preventing the housekeep from ever becoming a housekeep again.

In some implementations, when a housekeeper's misbehavior is observed by a committee member, the housekeeper will be immediately reported, with more than one-third of the committee members agree to deprive the node's housekeeper status, the node's deposit will be forfeited and the node will be relegated to an ordinary account.

When the housekeeper's misbehavior is determined as having a predefined severity, with approval of two-thirds of the committee members, the node will be added to a blacklist, its account will be canceled, and the node will not be allowed to join the system.

The committee members who wrote the recommendation letters for the blacklisted housekeeper will be voted again by the committee to determine whether they can retain their membership.

DETAILED DESCRIPTION

The blockchain technology was first proposed by Nakamoto Satoshi in 2008. It is a relatively new distributed technology and has excellent prospects in future applications. Bitcoin-derived blockchain is an intelligent Peer-to-Peer (P2P) network that uses distributed databases to process, transmit, and store data. A blockchain includes a series of data blocks generated using cryptographic methods. Each data block stores data concerning a number of Bitcoin network transactions, which may be used to verify the validity of the transactions (anti-counterfeiting) and to generate the next data block. The consensus mechanism of the blockchain includes a mathematical algorithm for building trust and assigning rights between different nodes in a blockchain system. Example consensus mechanisms used in the blockchain include the proof-of-work mechanism and the proof-of-stake mechanism. Both methods have their own pros and cons and have been widely used in blockchain applications.

The application of blockchain technology to a domain name system is relatively new. Example applications include Namecoin and Blockstack. Currently, similar technology has not been applied in China.

Namecoin was first proposed by bitdns. Dissatisfied with the current centralized Domain Name System (DNS), Namecoin attempts to establish a distributed domain name system using blockchain. Namecoin uses a separate blockchain that is independent from the blockchain associated with the Bitcoin.

Blockstack is a blockchain-based naming and storage system. It is a new system that has been transplanted from the Namecoin network to the Bitcoin network. Domain name resolution is also one of the functions of a Blockstack system.

These two applications are different due to their underlying blockchains. Although Namecoin rebuilds a blockchain, the consensus method implemented by Namecoin is the same as that of the Bitcoin—the proof-of-work mechanism. On the other hand, Blockstack is built directly on Bitcoin's blockchain and does not have its own blockchain. Blockstack also uses the proof-of-work mechanism to determine consensus. The proof-of-work function used in the Bitcoin system is SHA256. SHA is the abbreviation for Secure Hash Algorithm. SHA includes a family of cryptographic hash functions, which was designed by the National Security Agency (NSA) and released by the National Institute of Standards and Technology (NIST). SHA has been mainly applied to creating and verifying digital signatures. SHA256 is a hash algorithm within this family and has an output value of 256-bit. So far, there has been no effective attack on the SHA256 algorithm. Existing blockchain-based domain name systems have produce slow growths, because they are based on a fully decentralized proof-of-work consensus, small in size, and have refused maintenance by any professional organizations.

Blockstack is a blockchain-based naming and storage system built by San Francisco-based blockchain startups. Blockstack's underlying blockchain is the Bitcoin's blockchain and thus also implements the proof-of-work mechanism for determining consensus.

Bitcoin's blockchain is collaboratively maintained by anonymous nodes on a computer network. Proof is required that enough work has been done when each block is generated. This ensures untrustworthy nodes attempting to tamper with the historical data stored in a block do more work than trustworthy nodes which merely add one or more new blocks to the blockchain. Chaining the blocks together makes it impossible to modify a previous transaction without modifying all subsequent transactions. As new blocks are added to a blockchain, therefore, the cost of modifying transaction records in a block increases. The longest blockchain on the Internet is the main chain. Unless the attacker's computing power exceeds 50% of the total computing power of all nodes on the main chain, the attacker will be unable to alter a block or to create a longer chain to replace the main chain. In order to demonstrate the amount of work required to create a block, a mining node must compute a random number, so that the hash value of the block header does not exceed a predefined value set according to the difficulty.

A Bitcoin block includes a block header and a transaction list. The size of the block header may be 80 bytes, which may include: the hash value of the previous block, a random number, and the difficulty level of calculating the current hash value. The random number in the block header serves as input for verifying a Bitcoin's workload. SHA256 hash operations are performed by constantly changing the block header as input (e.g., changing different random numbers) to identify a specific random number so that the hash value satisfies the requirements. A satisfactory hash value consists of one or more leading zeros, the total number of which is determined based on the difficulty level of the network. After computing a hash value, a node packs (e.g., generates or creates) the block and broadcasts the newly-generated block to other nodes. After verification, the other nodes will link themselves to the newly-generated block. The block height increases, and then the nodes will start to work on the next block. The block height refers to the total number of blocks linked between the newly-generated block and the very first block of the Bitcoin chain, which is also referred to as the genesis block or the number 0 block.

Different blocks may have the same height, e.g., when two or more miners try to create the same block at the same time. This is why a blockchain may split. The general consensus is that when two branches are of different heights, the higher (or longer) branch is always accepted; when two branches are of the same height, the branch with the greater difficulty level is accepted; and when two branches are of the same height and difficulty level, the branch that has been created earlier in time is accepted. If none of these conditions distinguishes, the two branches will be processed in the order of being accepted by the network. This process ensures that the blockchain is unique. Only when the attacker's computing power exceeds 50% of the entire network, the attacker can he control the blockchain, which is commonly referred to as a 51% attack.

The proof-of-work mechanism may, therefore, provide the following advantages: first, the decentralized design provides a good reference for developing a domain name system; second, relying on the strong computing power of the entire network, it has at least partially solved the 51% attack problem.

The proof-of-work mechanism also has certain drawbacks. First, few modifications have been made for applying the proof-of-work mechanism to a domain name system. The proof-of-work mechanism uses Bitcoin-related technologies, but does not address the potential issues unique to resolving domain names. Second, computing power may be wasted. Some studies have shown, conservatively, that the energy consumption rate by the current overall operation of Bitcoin has reached 3 GW, approximately the total amount of energy consumption by the country of Ireland. If the Bitcoin network continues to expand at its current pace, the total amount of energy consumption will equal to that of the country of Denmark in 2020. The development of Bitcoin technology may therefore appear to be environmentally un-friendly.

While most current systems for determining consensus in a domain name system implement the proof-of-work mechanism, the proof-of-stake mechanism may also be used to determine consensus in a blockchain network. Peercoin may be the first digital currency system implementing the proof-of-stake mechanism. In a Peercoin system, a coin's age is important, which is generally defined as the length of time a coin holder has been holding the coin. For example, Li Ming accumulates a coin age of 900 coin days after receiving 10 coins from Han Mei and holding them for 90 days. Here, the process for generating a block is a special transaction called an interest-paying transaction. In an interest-paying transaction, a block holder can consume his coin age for interest and at the same time obtain the priorities for generating a block in network and for invoking the proof-of-stake mechanism when generating the blocks. Each block generated may include a primary input and one or more equity inputs; the primary input needs to comply with a hash target protocol. The method here involves performing a random hash function in a limited space, instead of searching a hash value in an unlimited space similar to what happens in a Bitcoin system. This process thus does not consume a large amount of energy. The random hash target that the primary and equity need to meet are related to the coin age; thus, the more coin age the primary input consumes, the easier it is to meet the target protocol.

In these implementations, blocks are also randomly generated; thus, chain splitting is almost inevitable. Unlike Bitcoin's implementation, Peercoin selects the main blockchain based on coin age. Each transaction in a block submits its consumed coin age to the block to increase the block's score; the block with the greater consumed coin age is then added to the main chain.

The main advantages of this proof-of-stake mechanism are as follows: first, it consumes less energy and is thus more environment-friendly. Blocks are generated without consuming enormous computing power, and maintaining the operation of such a network is also inexpensive; second, the decentralized design based on the stake provides a good reference for the further development of the domain name system.

The proof-of-stake mechanism also has certain drawback. First, this mechanism is not as related to and thus difficult to be applied to a domain name system. Second, the use of coin age as a factor may negatively affect the decentralization. The greater the coin age, the faster a block may be generated, and the higher chance the block is added to the main chain. As a result, block generation may become controlled by a small number of users who hold a large number of coins, negatively affecting the decentralization.

Consensus determination may be used to determine which computer is responsible for generating a block and for maintaining the consistency of a distributed ledger. Existing consensus determination mechanisms compete for the right to generate blocks based on the amount of computing power a node is equipped, leading to significant waste of energy, greater chance of chain splitting, and lower transaction per second, and lower throughput.

The present disclosure provides systems and methods for determining consensus in a decentralized domain name system, reducing or eliminating the above-identified technical problems.

An example method for determining consensus in a decentralized domain name system may comprise the following steps:
  A. forming a consortium blockchain network using domain network nodes and selecting one or more committee members from top-level domain nodes;
  B. in the consortium blockchain network, the committee member who received most votes from the committee members packs the genesis block of the consortium blockchain and generates a random number which is used to select a housekeeper to pack a next block;
  C. among all on-duty housekeepers in a duty cycle, the housekeeper that is assigned the same number as the random number generated in the previous block packs the current block and generates a random number for selecting a next housekeeper to pack the next block, each block must be verified and signed by more than half of the committee members before it can be added to the consortium blockchain (which is also referred to as supervising the housekeepers);

D. during the duty cycle, each housekeeper takes turns packing blocks and generating random numbers and the process is repeated. If a block is not approved by more than half of the committee members or if the block is not successfully packed within a predefined time frame, the housekeeper with the next number is requested to repack the block;

E. the last random number generated by a housekeeper before the duty cycle ends is used to select the housekeeper to pack the first block of the next duty cycle; and repeating Step C to Step E and the housekeepers' information for each duty cycle will be packed into the first block of the cycle.

In some implementations, the method further comprises: adding a new node to the committee as a new committee member, when more than 51% of the committee members approve the addition; the new node may join the top-level domain committee.

In some implementations, the method further comprises: identifying a housekeeper in the consortium blockchain, which may comprise the following steps:

a node in the consortium blockchain is recommended by a committee member and applies to become a housekeeper candidate; and a certain number of housekeepers are selected from all housekeeper candidates through committee members' votes.

In some implementations, committee members may have the dual status as a committee member and a housekeeper or the dual status as a committee member and a housekeeper candidate.

In some implementations, in the consortium blockchain network, regular nodes may join or exit a network at any time, discard messages, forge messages, and stop working; regular nodes may not generate blocks; regular nodes may only participate in block distribution and sharing and enjoy the services provided by she consortium blockchain.

In some implementations, the method further comprises: identifying a housekeeper candidate from domain nodes within the consortium blockchain, which may comprise the following steps:

registering a user account in the domain name system and submitting a housekeeper candidate application on behalf of the user account;

submitting at least one letter of recommendation signed by at least one member of the domain names committee; and an applicant becomes a housekeeper candidate after being approved by more than half of the committee members and submitting a deposit.

In some implementations, the method further comprises:

F. the top-level domain name committee votes and scores all housekeeper candidates after each duty cycle.

In some implementations: the vote in Step F may be a default vote of confidence or a designated vote of confidence.

In some implementations, the method further comprises:

G. the committee members determines whether or not a housekeeper is working honestly and completing tasks timely when they are on duty. If so, the committee will refund the deposit when the housekeeper voluntary withdraws; and if not, which may indicate that the housekeeper has not signed the block as promised or has misbehaved, the housekeeper may be disqualified by the committee, lose its deposit, become blacklisted, and s to apply to become a housekeeper again.

In some implementations, if a housekeeper's misbehavior is observed by a committee member, the housekeeper will be immediately reported. If more than one-third of the committee members vote to deprive the node's housekeeper status, the node's deposit will be forfeited and the node will be demoted to a regular account. If the housekeeper's misbehavior is deem severe, with the approvals of two-thirds of the committee members, the node will be added to a blacklist, have its account canceled, and disallowed to join the system. Committee members who wrote a recommendation letter for a blacklisted housekeeper will be voted by the committee to determine whether they can retain their committee membership.

The systems and methods described in the present disclosure may provide one or more of the following technical advantages: the committee member nodes and the housekeeper nodes often have high credibility and high participation. A top-level domain name committee is introduced to decentralize the domain name systems and domain name institutions. Committee members conduct compliance supervisions on nodes and data within an entire network. The housekeepers verify the validity of the transactions and pack the valid transactions into a block. In addition to verifying the validity of the transactions, the committee members also review and decide whether the block containing the transactions may be added to the blockchain. This process also indicates whether the committee members approve the transactions, which may be used to ensure transaction compliance in the entire network.

Separating the decision-making entities from the execution entities makes the distribution of rights and responsibilities clear. Packed blocks are signed by specialized record-keeping housekeepers, which reduces the number of nodes needed for verification and record-keeping. This in turn increases the efficiency for consensus verification and reduces the cost of election and voting among domain name nodes. A consensus process may not require the participation of the entire network. The consensus process consumes significantly less power and is done with low overhead, resulting in higher system performance and efficiency.

Record-keeping (or ledgering) nodes are elected by trusted committee member nodes. Record-keeping is done though by the record-keeping nodes collaborating with each other. Each block needs to be verified and approved by more than half of the committee member nodes. Each block is final and does not split.

Fault tolerance wise, a network can continue operating, even when 50% of all committee members of the entire network have erred. The entire decentralized domain name system err when more than half of the committee members are maliciously controlled, taken over, or malfunctioning at the same time. However, because each committee member node representing a professional organization in a different part of the world, it is almost impossible to have more than half of the committee members maliciously controlled, taken over, or malfunction at the same time.

The scoring process, the voting process, the rewards and penalties may constitute positive feedback, which will guide housekeepers in the network towards being honest, reliable and providing long-term online services. Rewards encourage nodes to compete for the housekeeper positions. The committee members' votes reflect their trust level of each housekeeper. The random assignment of numbers increases the liquidity of the housekeepers and prevents a single organization from continuously occupying as housekeeper role by controlling a large number of housekeeper candidates. The random assignment of numbers reduces the likelihood that a particular housekeeper is constantly elected, increasing the safety and reliability of the system.

Example Implementations

With the development of blockchain technology, applications for a decentralized domain name system have emerged. However, a fully decentralized domain name system implementing existing consensus mechanisms also excludes ICANN, domain name registration agencies, and domain name registration companies, limiting the development of the decentralized domain name systems. It also hinders the transitioning of the domain name system from a centralized structure to a decentralized structure.

The systems and methods for determining consensus in a decentralized domain name systems as described in the present disclosure focus on a decentralized computer system for resolving global domain names. The system may be formed and maintained by a group of professional organizations around the world. Separating the decision-making entities from the executions entities and adopting a collaborative record-keeping mechanism enable professional organizations to conduct compliance supervision of nodes and transaction data stored thereon within the entire network, smoothing the relationships between the supervision and management of professional organizations and the operation of a decentralized domain name system. After a decentralized domain name system generates a block, the consensus method requests transactions to be verified by more than 51% of the professional organizations in the network before being stored in a block. The 51% represents an agreement of a majority of the professional organizations in the network. Blocks are generated by specialized entities; each block is verified by 51% or more professional organizations, effectively avoiding blockchain splitting.

In a distributed system, multiple host nodes may form a network cluster. Since data are transmitted through asynchronous communications, it may be necessary to reach consensus among the host nodes. The blockchain architecture is a distributed architecture; all nodes within this peer-to-peer network adhere to a consensus mechanism and use the blockchain architecture to maintain a decentralized public ledger.

Figure 2:
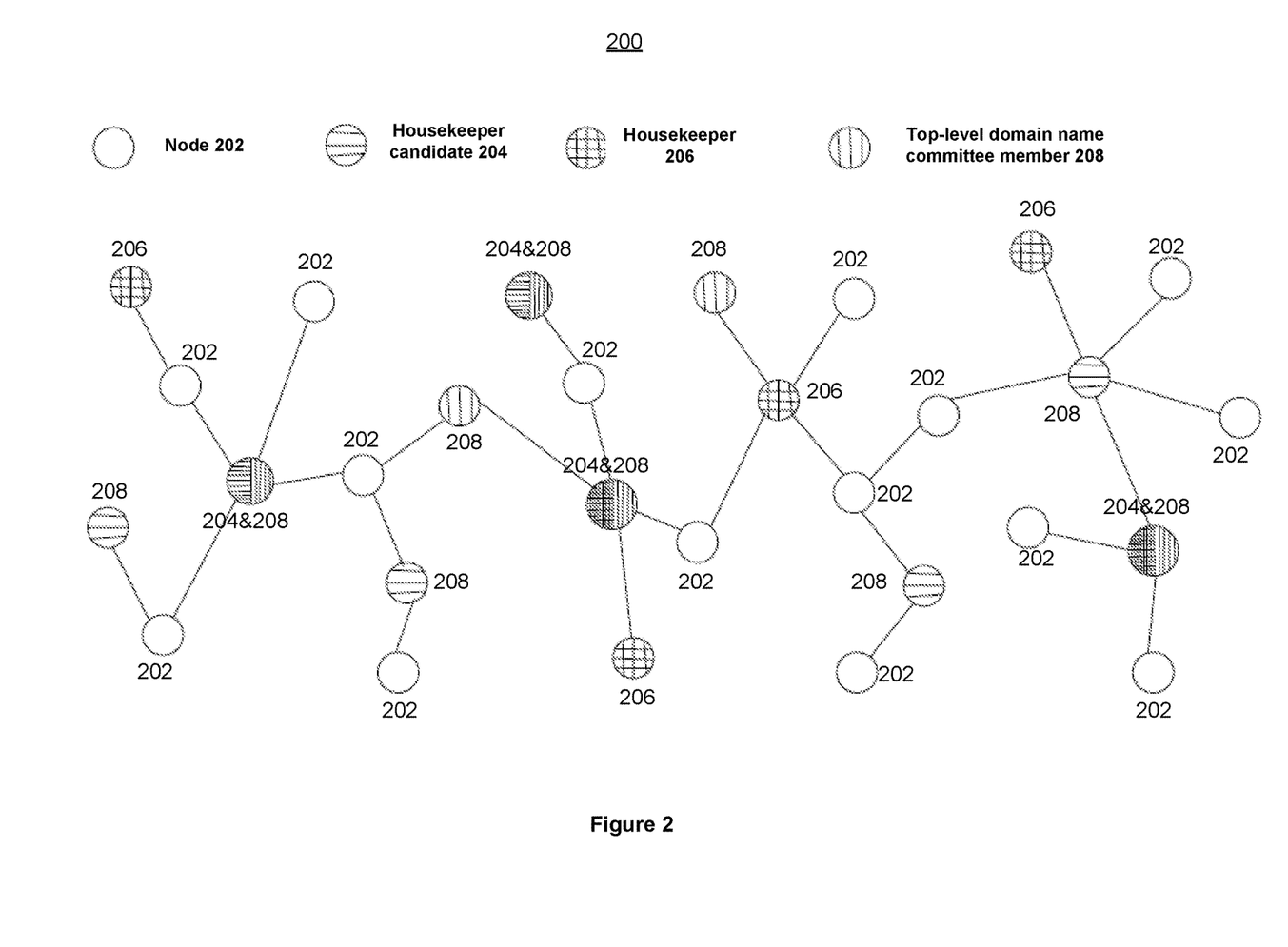
FIG. 2 is a block diagram illustrating an example decentralized domain name system, according to some implementations.

When determining consensus using technologies described in the present disclosure, each node may have a different role depending on the functions it is about to perform. As shown in FIG. 2, the following roles may be assigned to a node within a decentralized domain name system 200: a node role, a housekeeper candidate role, a house keeper role, and a top-level domain name committee member role.

Members of the top-level domain committee, a coalition formed by professional organizations and industries around the world A region or an industrial agency can become a member of the committee as a legal entity. Each legal entity either desires to independently manage its own second-level domain names, or expects to contribute and improve the management and implementation of committee protocol. But the common goals of the legal entities are forming a global peer-to-peer network while their second-level domain names are managed independently, jointly supervising and deciding the top-level domain name registration and domain name resolution, and sharing distributed databases with nodes globally. Members have the right to recommend, vote, evaluate housekeepers, verify blocks, verify transactions, and supervise the operations of a domain name node. Committee members also have the responsibilities to maintain distributed shared databases and resolve domain names. Each member has the same rights and responsibilities, equal status. Any new member must be approved by the majority of the existing members.

Professional record-keeping—"housekeepers." Housekeepers are entities that have been authorized to generate blocks; the number of housekeepers is limited. The implementation of the housekeeper status separates decision-making entities from execution entities. Regular nodes are not authorized to generate blocks, only housekeepers are. Blocks are generated by gathering and packing transaction information. Housekeepers are required to sign the blocks they pack. Housekeepers are elected from a list of housekeeper candidates by committee members through voting. The housekeepers randomly take turns to keep the record during the duty cycle. Housekeepers are re-selected by voting after each duty cycle ends. Members can have the dual status as a member and a housekeeper at the same time.

Record-keeping candidates—"housekeeper candidates." Because the total number of housekeepers is limited, the housekeeper candidates that were not elected as housekeepers may retain their candidate status, maintain their online time, and wait for the next round of voting. To become a housekeeper candidate, an applicant must be recommended by a committee member and approved by more than half of the committee members. Members can have the dual status as a member and a housekeeper candidate.

Figure 3:
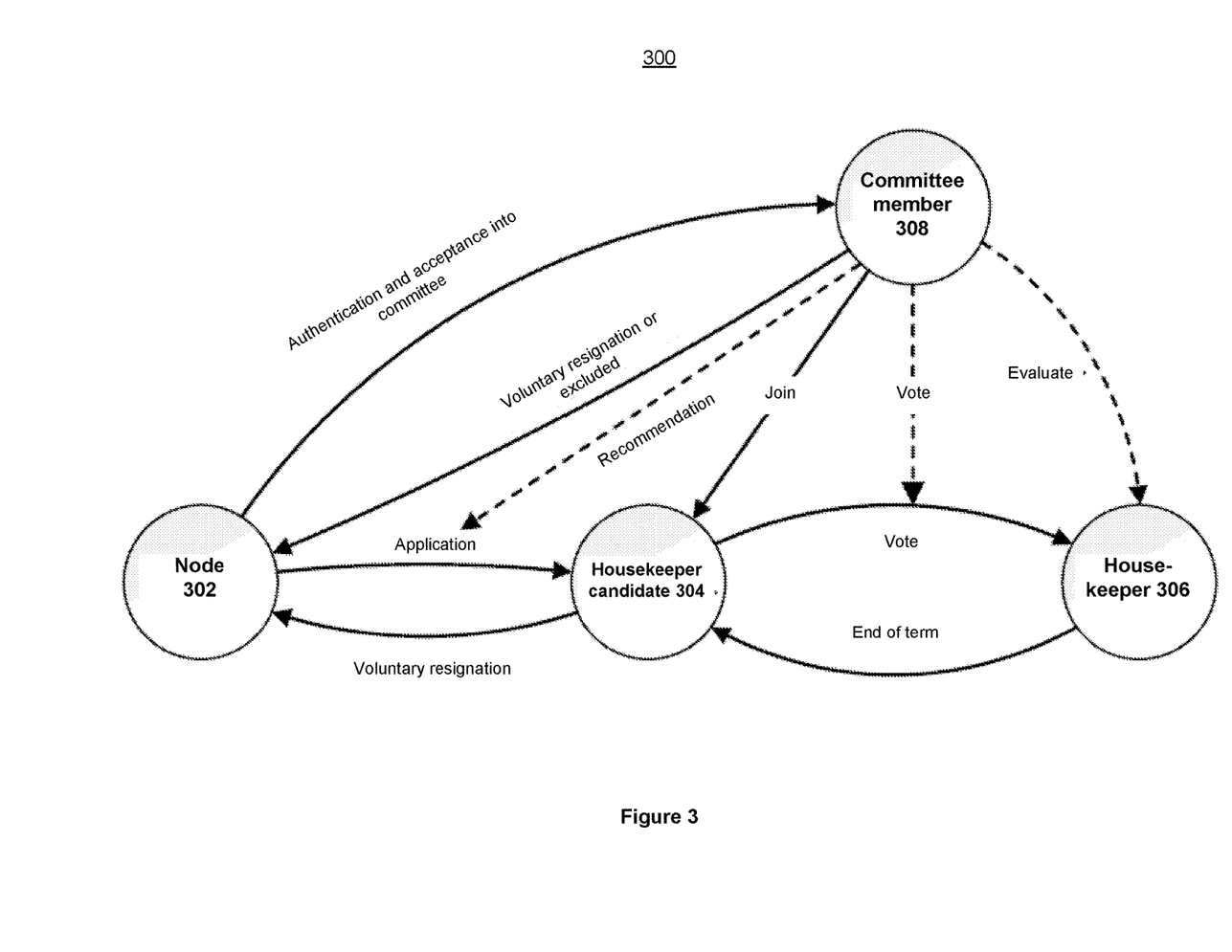
FIG. 3 is a block diagram illustrating an example process for consensus nodes to switch between different roles, according to some implementations.

Regular nodes. The three types of nodes identified-above are considered trusted nodes, because they are verified through voting. Regular nodes are generally untrustworthy. The behavior of regular nodes can be unpredictable: regular nodes can join or exit network at any time; regular nodes may discard messages, forge messages, and stop working. Regular nodes may not participate in generating blocks; instead, regular nodes may only participate in block distribution and sharing. They can also execute domain name queries. The existence of a large number of regular nodes provides fast query abilities a domain name system. As shown in FIG. 3, a node may switch between various different roles, according to some implementations.

The members of the top-level domain committee are similar to the members of the board of directors in a company. They may rate managers' executive skills, and collaboratively vote on managerial appointments, rewards, and penalties. The housekeeper nodes are similar to the managers in a company. They rely on their own professional competence to carry out tasks.

Figure 1A:
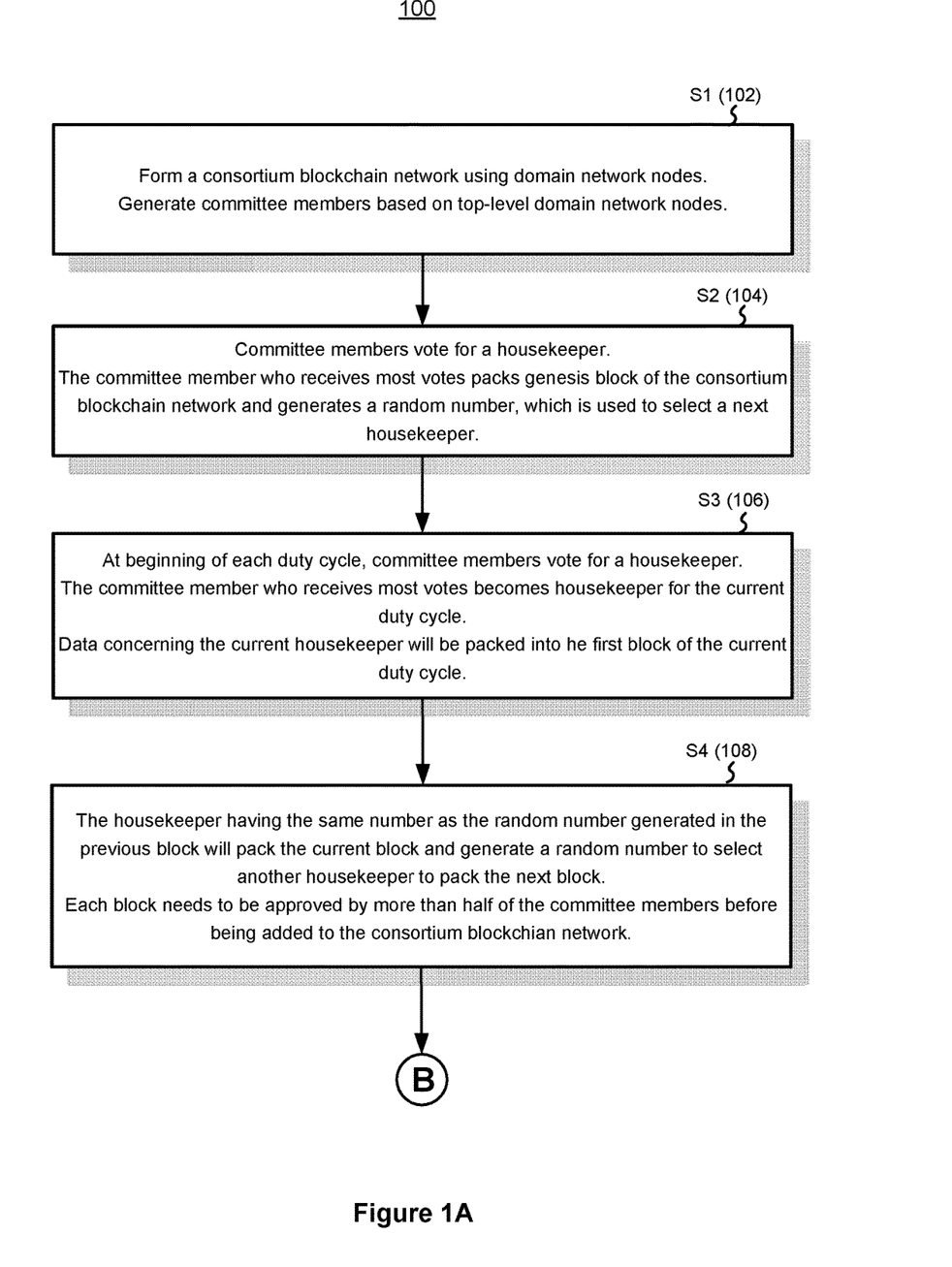
FIGS. 1A-1B are flowcharts illustrating an example method for determining consensus in a decentralized domain name system, according to some implementations.
Figure 1B:
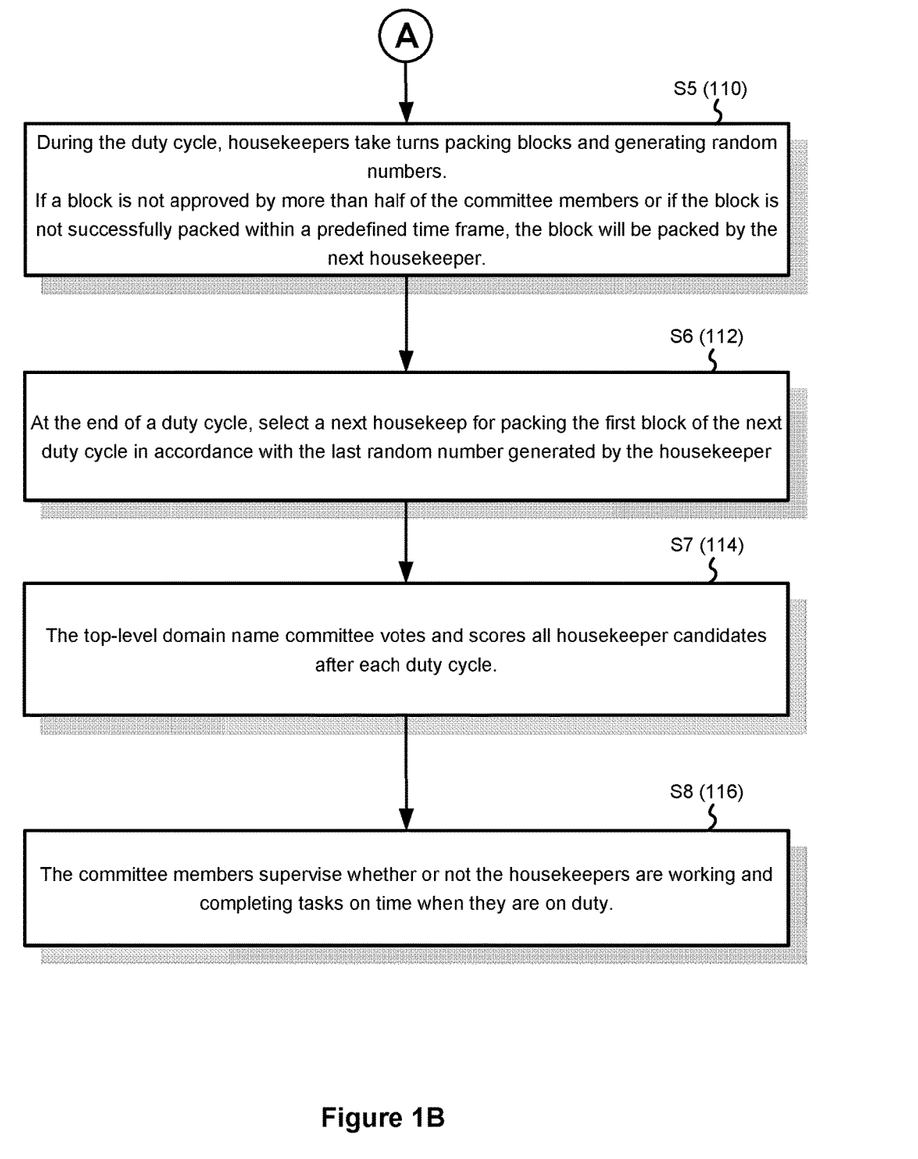

FIGS. 1A-1B are flowcharts illustrating an example method 100 for determining consensus in a decentralized domain name system, according to some implementations.

At step S1 (102), using blockchain technology to form consortium blockchain network among network nodes in a domain, and using network nodes in top-level domain to generate committee members; a coalition formed by professional organizations and industries around the world, a region or an industrial agency may become a member of the committee as a legal entity. Each legal entity either desires to independently manage its own second-level domain names, or expects to research the managing and implementation of the technology and improve the protocol. But the common goals of the legal entities are forming a global peer-to-peer network while their second-level domain names are managed independently, jointly supervising and deciding the top-level domain name registration and domain name resolution, and sharing distributed databases with nodes globally. Members have the right to recommend, vote, evaluate housekeepers and verify blocks, verify transactions and supervise domain name operations cooperatively. Members also have the responsibilities to maintain distributed shared databases and resolve domain names. Each member has the same rights and responsibilities, equal status. A new member must be approved by the majority of the existing members.

At step S2 (104), after the consortium blockchain network is formed, the committee members recommend others or themselves as housekeeper candidates. The predefined number of housekeepers is Nc; the predefined time period for a duty cycle is Tc; and the predefined block packing period is Tb (e.g., the amount of time needed to generate a block). In a consortium blockchain network, the committee member who received the most votes from the other committee members packs the genesis block of the consortium blockchain network and generates a random number which is used to pick a housekeeper to pack the next block.

At step S3 (106), at the beginning of each duty cycle, the committee votes on the housekeeper candidates. The top Nc most voted candidates become housekeepers during the instant duty cycle to generate blocks.

The housekeeper for packing the first block in each duty cycle is selected according to the number randomly generated by the housekeeper that generated the last block during the previous duty cycle. Especially, in a consortium blockchain network, the committee member who received the most votes from the other committee members will pack the genesis block of the consortium blockchain network and generates a random number which is used to pick a housekeeper to pack the next block.

At step S4 (108), among all the on-duty housekeepers in a duty cycle, the housekeeper that has been assigned the same number as the random number generated in the previous block packs (or generates) the current block and generates a random number for selecting another housekeeper to pack the next block. Each block must be reviewed and signed by more than half of the committee members before it can be added to the blockchain. This process serves to supervise the housekeepers.

Figure 4:
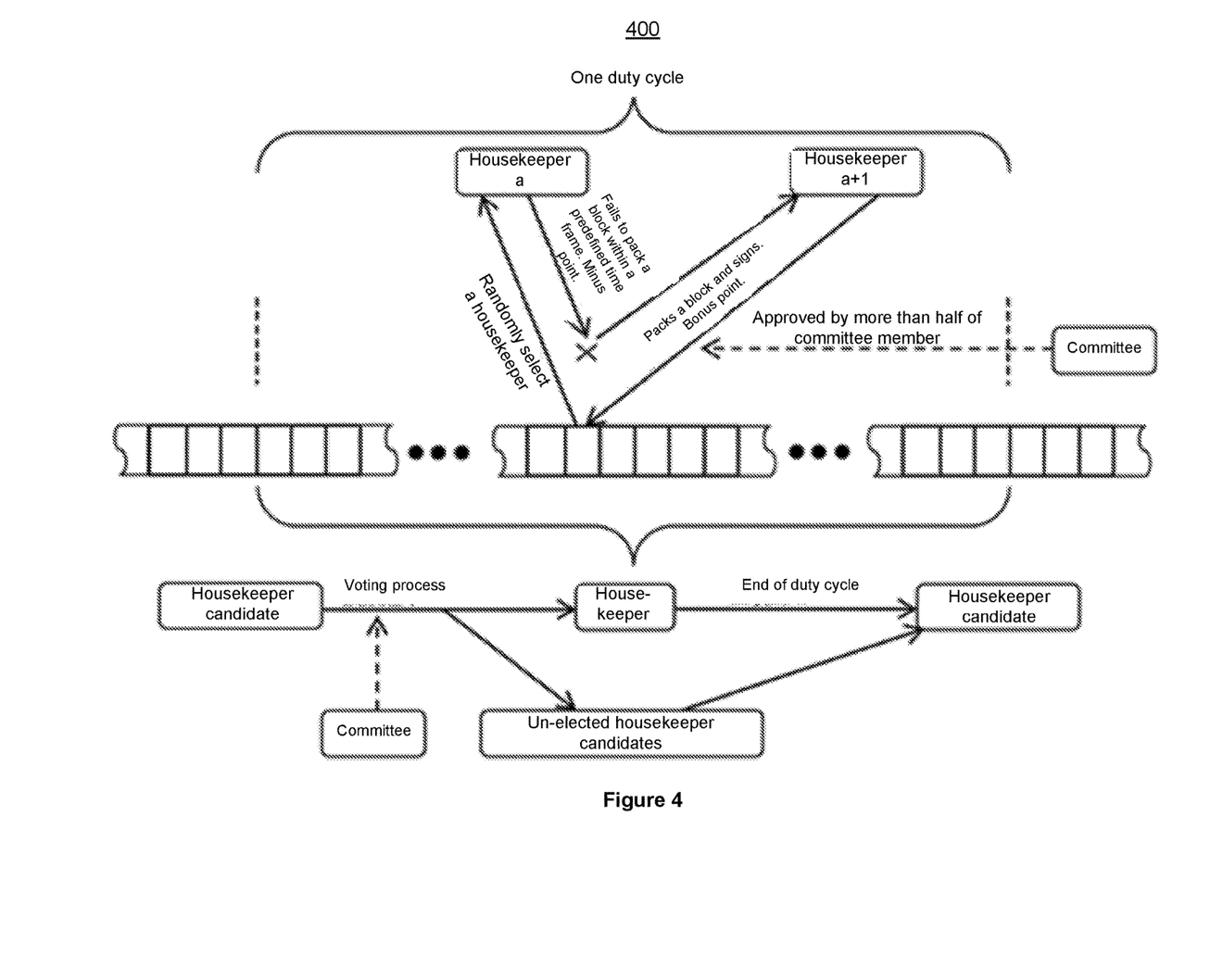
FIG. 4 is a diagram illustrating an example duty cycle, according to some implementations.

One of the many technical advantages provided by the example system is the separation of the decision-making entities from the execution entities. The separation creates roles such as "committee", "housekeeper", and "housekeeper candidate" based on different functions. Housekeepers are elected from the housekeeper candidates. They are specialized nodes for packing transactions of the domain name system operation into blocks. The housekeepers are regularly (every other duty cycle) reelected together with housekeeper candidates. During the duty cycle, a housekeeper is randomly selected to sign a block in each block packing period. FIG. 4 is a diagram illustrating an example duty cycle 400, according to some implementations.

In order to become housekeepers through recommendation and competition, to obtain record-keeping authorization, and to receive the corresponding rewards, the housekeeper nodes must maintain the maximum online time, work honestly, and timely complete the task of packing blocks. The housekeepers must also strictly comply with the protocol implemented by the top-level domain committee, including changes to the protocol. At the same time, housekeepers are scored by the committee members. According to the housekeepers' performance, the committee members will cast votes of confidence on the housekeepers to decide whether they can retain their status for the next duty cycle. The housekeepers are randomly picked to sign the block. If a housekeeper misses the block signing, the system will automatically deduct the housekeeper's points. A housekeeper may lose most of the committee's default votes of confidence in the next reelection and may lose its housekeeper status.

At step S5 (110), during a duty cycle, the housekeepers take turns packing blocks and generating random numbers to repeat the process.

The housekeepers randomly take turns to keep the record during the duty cycle. Each housekeeper has the same chance for record-keeping. The housekeeper need to pack a block in the given record-keeping period. Each block must be verified by more than half of the domain name committee members, otherwise the block is invalid, and the block will be repacked by the housekeeper with the next number. The housekeepers verify the validity of the transactions and pack the valid transactions into a block. In addition to verifying the validity of the transactions, the committee members also review and decide whether the block containing the transactions can be added to the blockchain. This process shows whether the committee members approve the transactions, it is also another way of verifying the validity of the transactions.

The members are generally professional organizations and industries around the world. The applicant organization will be examined according to the self-determined protocol by the coalition. Under the conditions of the protocol, the node will join as a top-level domain committee member after being approved by the majority of the committee members. The top-level committee members are considered to be trusted nodes in the system.

There are two steps to become a housekeeper: (1) applying to become a housekeeper candidate with a recommendation; (2) the housekeeper candidates are eligible to be voted after the end of each duty cycle; unelected housekeepers retire to become housekeeper candidates. A certain number of housekeepers are selected from all housekeeper candidates through committee members' votes.

(1) Becoming a Housekeeper Candidate

A node needs to register a user account in the domain name system and submit a housekeeper candidate application. This can be implemented as a function. The applicants submit a letter of recommendation signed by at least one member of the domain names committee. A secret key, similar to an invitation code, is generated by a member of the domain name committee on a client device by invoking the function. The implementation mode is asymmetric encryption. The private key is used to encrypt the content of the recommendation letter. After the public key is decrypted, it can use to determine whether a recommendation letter is forged. An applicant may become a housekeeper candidate after being approved by more than half of the committee members and submitting a deposit.

If a node has a user account, it can become a housekeeper candidate after submitting a letter of recommendation signed by at least one member of the domain names committee, being approved by more than half of the committee members, and submitting a deposit.

If a node is a member of the committee, it can submit the application directly to the committee without a letter of recommendation by another committee member. The node may become a housekeeper candidate after being approved by more than half of the committee members and submitting a deposit. A node may have the dual status as a committee member and a housekeeper candidate. If a node is elected as a housekeeper, the node will have the dual status as a committee member and a housekeeper.

(2) Becoming a Housekeeper

Record-keeping period: also referred to the block packing period, a record-keep period is determined by the system protocol. If a housekeeper cannot generate a block within the predefined record-keeping period, the authorization to generate a block is passed to the housekeeper with the next number.

Duty cycle: during a duty cycle, housekeepers are responsible for record-keeping and packing the blocks. After the end of a duty cycle, housekeepers go through another round of election based on popular votes by committee members. Discharged housekeepers will automatically become housekeeper candidates, and together with other housekeeper candidates, be voted on by the committee members of the top-level domain committee. A predefined number of housekeeper candidates will be accepted as housekeepers according to the votes.

At step S6 (112), the last random number generated by a housekeeper before the duty cycle ends is used to select the housekeeper to pack the first block of the next duty cycle.

At step S7 (114), at the end of each duty cycle, the top-level domain committee will score and vote all housekeeper candidates, and repeat Steps S3 to Step S7.

Vote of Confidence: after the end of each duty cycle, members of the top-level domain name committee cast votes on all housekeeper candidates. The number of votes that each member is allowed to cast does not exceed half the number of housekeeper candidates.

Default vote of confidence: committee members score each housekeeper in a duty cycle; the committee members will vote for a predefined number of the top-scored housekeeper candidates.

Designated vote of confidence: a professional organization can designate a trusted housekeeper candidate to cast the vote on its behalf When a duty cycle restarts, the list of all housekeepers stored on each committee member node is updated and the score is reset. A housekeeper gains points every time a block passes a committee member's verification. A housekeeper loses points if the verification fails. A housekeeper will lose points or even have the score reset, if the housekeeper fails to timely pack a block (e.g., fails to pack the block within a predefined time period). After the end of a duty cycle, the committee's scores reflect its trust level of each housekeeper, and the scores also serve as the basis for the default vote of confidence. Committee members will also cast a small portion of their default votes of confidence to the housekeeping candidates who failed to become housekeepers in the last duty cycle. The default votes of confidences will be given to the housekeeper candidates that have no bad records and stayed online the longest.

After the end of a duty cycle, housekeepers may receive rewards based on their scores for their work performance. Housekeepers that missed block signing will lose their rewards, in part or in full, for this instant duty cycle.

At step S8 (116), the committee members determine whether or not the housekeepers are working honestly and completing tasks on time when they are on duty. If so, the committee will return the deposit when a housekeeper voluntarily withdraws; If not, it means the housekeepers have not signed the block as agreed or have misbehaved, the housekeepers will be dismissed by the committee, lose their deposit, or even be blacklisted, and will never be allowed to apply to become a housekeeper again.

A regular node must pay a deposit to the committee when applying to become a housekeeper candidate. If a housekeeper works honestly and completes tasks on time, the committee will return the deposit when the housekeeper voluntarily withdraws or retires. If a housekeeper fails to sign a block as agreed or has misbehaved, the housekeepers will be dismissed by the committee, lose their deposit, or even be blacklisted, and will never be allowed to apply to become a housekeeper again.

If a housekeeper's misbehavior is observed by a committee member, the housekeeper will be immediately reported, with more than one-third of the committee members agree to deprive the node's housekeeper status, the node's deposit will be forfeited and the node will be relegated to an ordinary account.

If the housekeeper's misbehavior is severe, with approval of two-thirds of the committee members, the node will be added to a blacklist, its account will be canceled, and the node will not be allowed to join the system.

The committee members who wrote the recommendation letters for the blacklisted housekeeper will be voted again by the committee to determine whether they can retain their membership.

Figure 5:
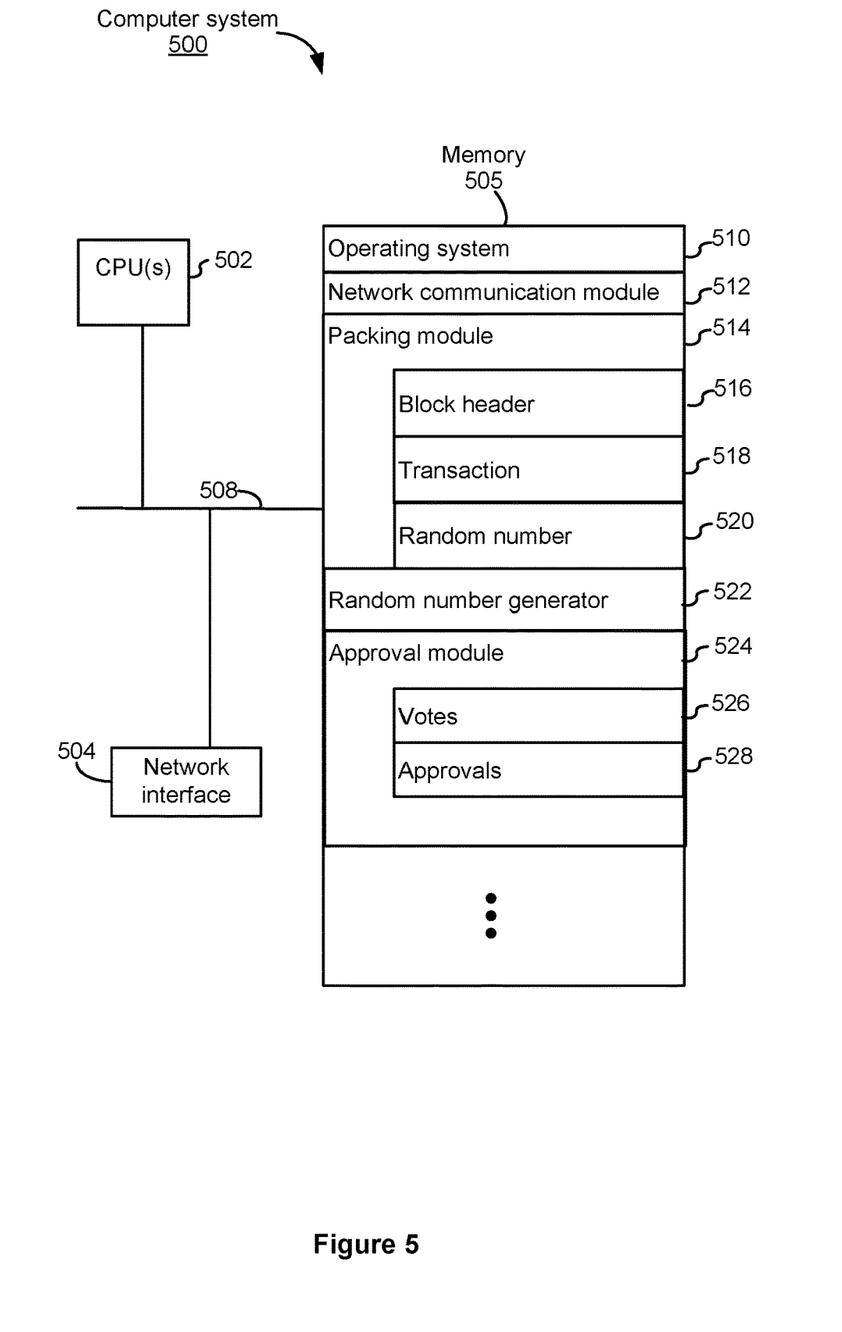
FIG. 5 is a block diagram illustrating an example computer system 500, according to some implementations.

FIG. 5 is a block diagram illustrating an example computer system 500. The computer system 500 typically includes one or more processing units CPU(s) 502 (also referred to as processors), one or more network interfaces 504, memory 506, and one or more communication buses 508 for interconnecting these components. The communication buses 508 optionally include circuitry (sometimes called a chipset) that interconnects and controls communications between system components. The memory 506 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

an operating system 510, which includes procedures for handling various basic system services and for performing hardware dependent tasks;

a network communication module (or instructions) 512 for connecting one node with other nodes via the one or more network interfaces 604 (wired or wireless) or a communication network;

a packing module 514 for packing one or more blocks in accordance with the following:
  a block header 516;
  one or more transactions 518; and
  a random number 520;

a random number generator 522 for one or more random numbers 520;

an approval module 524 for reviewing and approving blocks and housekeeper and committee member applications based on the following;
  one or more votes 526; and
  one or more approvals 528.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 606 optionally stores a subset of the modules and data structures identified above. Furthermore, the memory 606 may store additional modules and data structures not described above.

Although FIG. 5 shows a "computing system 500," FIG. 5 is intended more as functional description of the various features which may be present in computer systems than as a structural schematic of the implementations described herein. In practice, and as recognized by those of ordinary skill in the art, items shown separately could be combined and some items could be separated.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, without changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The invention claimed is:

1. A method for determining consensus in a decentralized domain name system, comprising:
  A. forming a consortium blockchain network that includes a plurality of domain network computer nodes and selecting a plurality of committee member computer nodes from the plurality of domain network computer nodes, wherein
    each committee member computer node, selected from the plurality of domain network computer nodes, is located within a different second level domain name system in the decentralized domain name system, and wherein
    each second level domain name system shares distributed databases with one or more other second level domain name systems, but is operated and managed independently from the one or more other second level domain name systems;
  B. generating, by the committee member computer node, which receives the most votes from other consortium member computer nodes, a genesis block of the consortium blockchain network and randomly selecting, by the committee member computer node, a first housekeeper computer node from among all housekeeper computer nodes which are on-duty during a first duty cycle, wherein
    consortium member computer nodes consist of one or more committee member computer nodes and one or more housekeeper computer nodes;
  C. generating, by the first housekeeper computer node, a first block of the first duty cycle and randomly selecting, by the first housekeeper computer node, a next housekeeper computer node from among the housekeeper computer nodes which are on-duty during the first duty cycle;
    determining (1) that the first block, which differs from the genesis block, is verified and signed by more than half of the committee member computer nodes; and
    responsive to the determining (1), adding the first block to the consortium blockchain network;
  D. generating, by one or more of the housekeeper computer nodes which are on-duty during the first duty cycle, one or more next blocks and randomly selecting, by the one or more housekeeper computer nodes which are on-duty during the first duty cycle, one or more next housekeeper computer nodes from among the housekeeper computer nodes which are on-duty during the first duty cycle, including:
    determining (2) that a next block, in the one or more next blocks, is not verified and signed by more than half of the committee member computer nodes or (3) that the next block is not generated within a predefined time period, responsive to the determining (2) or (3), generating, by a different housekeeper computer node which is randomly selected from among the housekeeper computer nodes which are on-duty during the first duty cycle, the next block again;

E. generating, by the last housekeeper computer node selected during the first duty cycle, a first block of a second duty cycle, and repeating Step C to Step E to generate blocks in the second duty cycle, wherein generating a first block in each duty cycle includes: storing information identifying all housekeeper computer nodes which are on-duty in that duty cycle in the first block generated during that duty cycle.

2. The method of claim 1 further comprising:

receiving an application request from a new computer node, wherein the new computer node is applying to become a committee member computer node in the consortium blockchain;

responsive to receiving the application request, transmitting a response to the new computer node instructing the new computer node to send a request to the committee member computer nodes;

determining that more than 51% of the committee member computer nodes approve the application request from the new computer node;

responsive to the determining, admitting the new computer node as a new committee member computer node of the top-level domain committee computer nodes.

3. The method of claim 2 further comprising:

admitting a computer node in the consortium blockchain to become a housekeeper computer node, including:

determining that the computer node is recommended by a committee member computer node and is applying to become a housekeeper candidate;

selecting a predefined number of housekeeper computer nodes from all housekeeper candidates in accordance with votes on each housekeeper candidate by committee member computer nodes.

4. The method of claim 3, wherein all committee member computer nodes are configured to have a first dual status as a committee member and a housekeeper or a second dual status as a committee member and a housekeeper candidate.

5. The method of claim 4, wherein computer nodes that are not committee member computer nodes are configured to performing following functions: joining or exiting the consortium blockchain network at any time, discarding one or more messages, forging one or more messages, and ceasing working; and wherein computer nodes that are not committee member computer nodes are configured not to participate in generating a block, but only to perform following functions: block distribution and sharing, as well as consuming services provided by the consortium blockchain network.

6. The method of claim 5 further comprising, admitting the computer node in the consortium blockchain to become the housekeeper candidate node, including:

(1) determining that the computer node has registered a user account in the decentralized domain name system and submitted a housekeeper candidate application;

(2) determining that the computer node has submitted a letter of recommendation signed by at least one committee member computer node of the domain name committee member computer nodes; and (3) determining that the computer node has been approved by more than half of the committee member computer nodes and has submitted a deposit.

7. The method of claim 6 further comprising:

F. requesting the top-level domain name committee member computer nodes to vote and score all housekeeper candidate computer nodes after each duty cycle.

8. The method of claim 7, wherein a vote is either a default vote of confidence or a designated vote of confidence, and wherein a default vote of confidence is given by committee member computer nodes to a housekeeper node in a duty cycle; and a designated vote of confidence is given by a professional organization to a trusted housekeeper candidate computer node asking the trusted housekeeper candidate computer node to cast a vote on behalf of the professional organization.

9. The method of claim 8, further comprising:

G. requesting committee member computer nodes to determine whether each housekeeper computer node is working and completing tasks timely when they are on duty;

determining (i) that a housekeeper computer node is working and completing tasks timely;

responsive to the determining (i), causing the committee member computer nodes to return the deposit when a housekeeper computer node voluntarily withdraws;

determining (ii) that a housekeeper computer node is either not working or not completing tasks timely;

responsive to the determining (ii), deeming the housekeeper computer node as having not signed a block as agreed or misbehaved, and causing the committee member computer nodes to do one or more of: dismissing the housekeeper computer node, withholding the deposit submitted by the housekeeper computer node, blacklisting the housekeeper computer node, and preventing the housekeeper computer node from ever becoming a housekeeper computer node again.

* * * * *